DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 6, 1970

870 O.G. 17

T870,004

DISPERSIONS OF LINEAR, SATURATED POLYESTERS

William Ross Bryan, Lloyd Powell Foster, and Freddie Allen Shepherd, all of P.O. Box 511, Kingsport, Tenn. 37662

Filed Apr. 14, 1969, Ser. No. 816,072
Int. Cl. C09d *3/64;* C10m *1/18, 1/26*
U.S. Cl. 260—22
No Drawing. 13 Pages Specification

Dispersions of linear, saturated polyesters derived from a dicarboxylic acid and a diol, e.g. poly(ethylene terephthalate), in other polymers and/or in metal soaps possess utility as thickeners for lubricating oils and greases, as hot melt adhesives, and in oil wells for the prevention of large crystal formation. Polymers which may be used singly or in combination for dispersing the polyesters include polymers of $\alpha$-monoolefins having from 2 to about 10 carbon atoms (such as low density polyethylene, high density polyethylene and amorphous polypropylene), oxidized or chlorinated polyolefins, polyvinyl resins, polyacrylates, ethylene-vinylacetate copolymers and polymers of mixed olefins. Lithium stearate, calcium stearate, barium stearate, sodium stearate, or mixtures thereof can be used as the metal soap in which the polyesters are dispersed. Such dispersions are formed by heating a mixture of the polyester and other polymer, metal salt or mixture thereof and stirring the resultant melt. The polyester is finely dispersed in the melt by a high shear technique. Oils or organic solvents may be used as base stocks or diluents for the polyester/polymer dispersions. The polymer melt dispersing temperature must be below the maximum allowable processing temperature for any component. High temperature stabilizers, such as phenothiazine, are of value.